(No Model.)

W. MEAKIN.
MACHINE FOR REDUCING BITUMINOUS ROCK.

No. 442,815. Patented Dec. 16, 1890.

Witnesses
Michael Hettrich
Arthur James Sparrow

Inventor
William Meakin

UNITED STATES PATENT OFFICE.

WILLIAM MEAKIN, OF SAN FRANCISCO, CALIFORNIA.

MACHINE FOR REDUCING BITUMINOUS ROCK.

SPECIFICATION forming part of Letters Patent No. 442,815, dated December 16, 1890.

Application filed March 19, 1890. Serial No. 344,564. (No model.)

*To all whom it may concern:*

Be it known that I, WILLIAM MEAKIN, a British subject, residing at 1714 Hyde street, in the city and county of San Francisco, State of California, have invented a new and useful Machine for Reducing Bituminous Rock, of which the following is a specification.

My invention relates to improvements in machines for reducing bituminous rock; and the objects of my improvements are, first, to provide a machine which will thoroughly disintegrate and melt the rock without deterioration in the quality thereof; second, to secure a continuous discharge of melted rock from the machine during all the time in which it is at work. I attain these objects by the mechanism illustrated in the accompanying drawings, in which—

Figure 1:
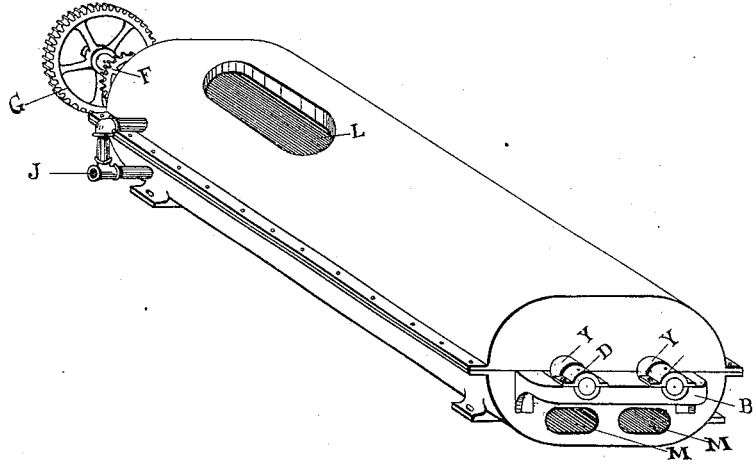
Figure 2:
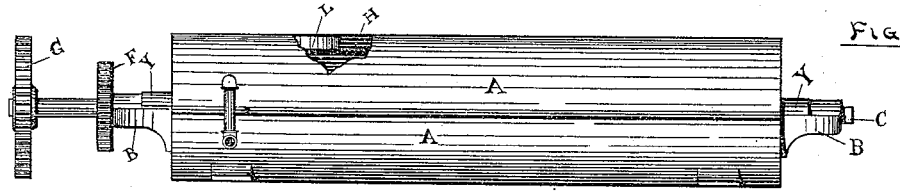
Figure 3:
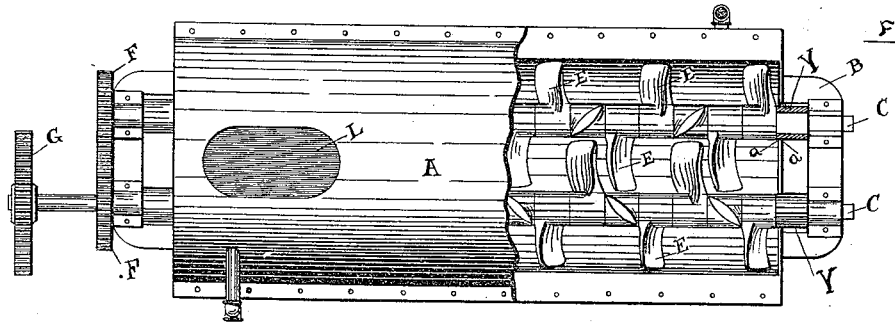
Figure 4:
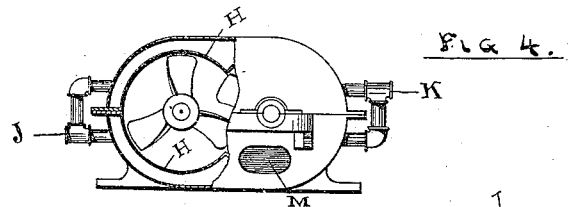

Figure 1 is a perspective view of the entire machine, Fig. 2, a side view of complete machine; Fig. 3, top view of machine with part of cover removed, showing positions of knives on the shafts; Fig. 4, part cross-section and part end view.

Similar letters refer to similar parts throughout the several views.

The main frame-work of machine consists of the trough A, with suitable bearings at each end to carry two revolving shafts C C. On each of the shafts C C are fixed a number of knives E, forming a series arranged spirally upon the shaft, extending the whole length of the inside of trough A. These shafts are geared together by the gear-wheels F, and the whole is put in motion by a gear or band wheel G. The trough A is made in two pieces, being jointed horizontally at the center and bolted together, as shown, each part being constructed with a steam-jacket H, as shown in section, Fig. 4, and connected with each other and with the boiler by the steam-pipe J, the pipe K being for the exit of waste steam or water. An opening L is made in the top of this trough or casing for the admission of the material to be used and one or more openings M at the end of machine for delivery of the melted rock.

The knives E and the method of fixing them to the shafts are peculiar. They are made, as shown in the drawings, with two sharp edges, thus being reversible, as these sharp edges are necessary for the disintegration of the rock, and when one edge is worn out they can be taken off and reversed, thus presenting a new sharp edge to the work. In the eye of these knives E, extending through the whole depth of the hub, I cast three projecting pieces to fit loosely in a like number of grooves provided in each shaft C. By this arrangement the knives may be set upon the shaft, so as to bring each knife one third of a circle in advance of its next neighbor on the shaft, and the two shafts being set apart sufficiently far to allow the knives on one to just clear the hubs of those on the opposite shaft, and when revolving and the rock is thrown in the opening L it falls between the knives on the two shafts and is cut into small pieces, which are then easily melted by the heat from the steam-jacket and forms a continuous discharge. It will be seen that a further purpose in this arrangement of the knives is to keep the machine from "clogging" or to prevent an accumulation of melted rock in any part of the machine, as, although the knives clear each other on the opposite shafts, they scrape every part of the chamber A, also the hubs of each other on the opposite shafts.

I am aware that two revolving shafts, working side by side, have been used for mixers before my invention; but I am not aware and do not believe that the two revolving shafts, each containing knives, as described, have ever been used in combination with a double-walled steam-heated trough, as set forth, for this or any other purpose.

Therefore what I claim, and desire to secure by Letters Patent, is—

A bituminous-rock-disintegrating machine comprising a double-walled steam-heated trough and a similarly-shaped double-walled steam-heated upper shell or inverted trough, which when united with the lower trough forms two intersecting cylinders corresponding in size and shape with the cylinders described by the revolving mixing-blades upon the inclosed shafts, suitable inlet and outlet openings being provided through said trough-shaped casings, all substantially as shown and described.

WILLIAM MEAKIN.

Witnesses:
MICHAEL HETTRICH,
ARTHUR JAMES SPARROW.